Dec. 28, 1965     E. J. BARNES     3,225,868
HAND TRUCK
Filed Oct. 9, 1964
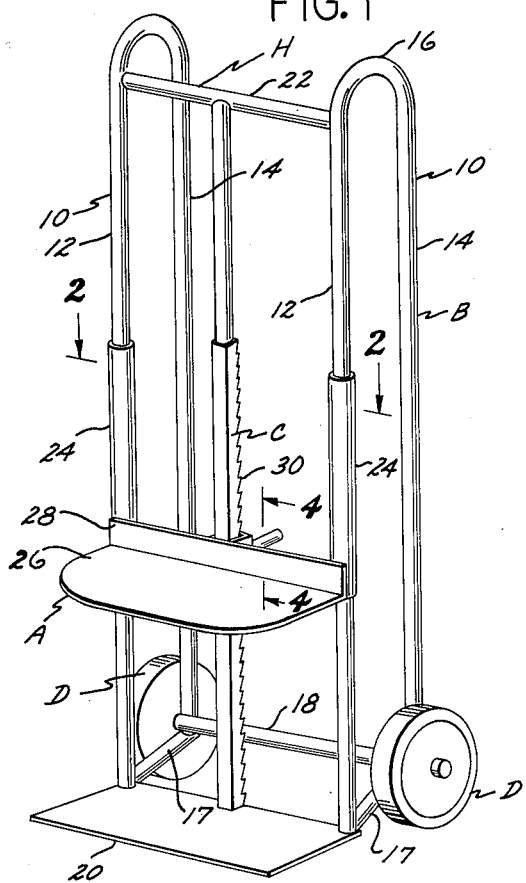
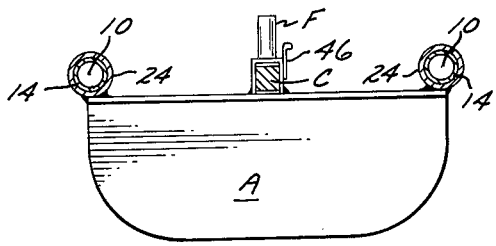
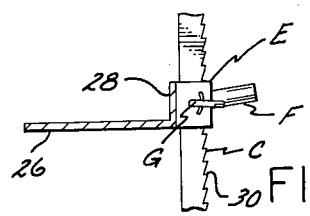
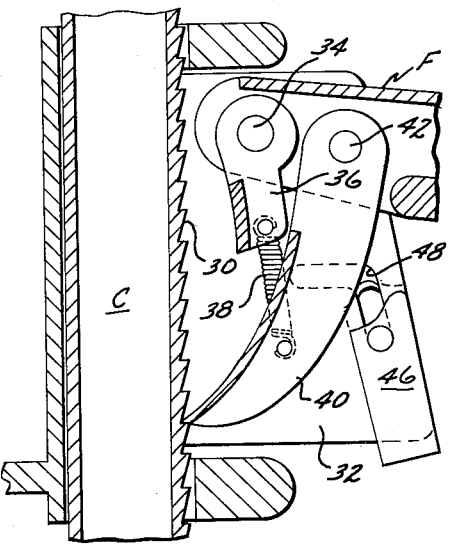
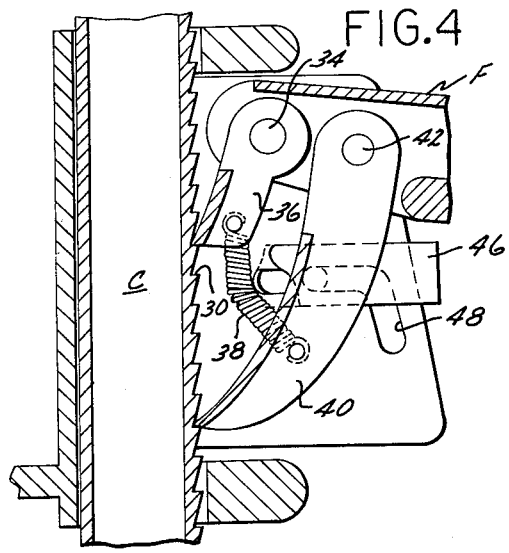
INVENTOR.
ELMER J. BARNES
BY
William C. Bobrock
ATTORNEY ns Patent Office 3,225,868
Patented Dec. 28, 1965

3,225,868
HAND TRUCK
Elmer J. Barnes, 10750 Jurupa, Mira Loma, Calif.
Filed Oct. 9, 1964, Ser. No. 402,900
4 Claims. (Cl. 187—9)

The present invention relates generally to hand trucks, and more particularly to one by means of which it is not only possible to pick up heavy objects to be transported from one location to another, but one which may be used to raise or lower a load to a required elevation either at its destination or prior to arrival thereto.

A major object of the present invention is to provide a hand truck of compact design and simple mechanical structure that is adapted for use in not only transporting heavy objects from place to place, but in raising or lowering a load such as a refrigerator, hot water tank, or the like, to a required elevation to permit the easy positioning of the load being transported when the destination is reached.

Another object of the invention is to supply a hand truck that is simple and easy to use, and one which embodies a jack as an integral part thereof to permit the raising or lowering of the load being transported thereby to a required elevation.

Yet another object of the invention is to furnish a hand truck that is relatively light in weight in which a vertically extending rack bar not only serves as a part of the jack for raising and lowering the load being transported, but is also incorporated as a part of the frame to reinforce the same against the weight of the load during transportation thereof.

These and other objects and advantages of the present invention will become apparent from the following description thereof, and from the accompanying drawing illustrating the same, in which:

FIGURE 1 is a perspective view of the hand truck of the present invention;

FIGURE 2 is a fragmentary transverse cross-sectional view of the truck, taken on the line 2—2 of FIGURE 1;

FIGURE 3 is a fragmentary, side elevational view of the jack portion of the device;

FIGURE 4 is a fragmentary, longitudinal cross-sectional view of the jack, taken on the line 4—4 of FIGURE 1;

FIGURE 5 is another view of the jack shown in FIGURE 4, with the jack in a different position.

With continued reference to the drawing for the general arrangement of the hand truck, it will be seen in FIGURE 1 to include a platform A that is longitudinally movable on a frame B which is provided with a longitudinally extending rack bar C. The frame B is movably supported on two laterally spaced wheels D.

A jack mechanism E is affixed to platform A which engages the rack bar C. Manual reciprocation of a handle F that projects rearwardly from the mechanism E causes the platform A to be moved upwardly relative to the frame B (FIGURE 1) to a desired elevation thereon. The jack mechanism E includes a trigger G, which when manually moved from a first to a second position, permits the mechanism E and platform A attached thereto to be lowered as a unit to a desired elevation on the frame B. The jack mechanism E illustrated in the drawing is of the mechanical type, but a hydraulic jack (not shown) may be used in lieu thereof if desired.

In use, the hand truck, identified generally by the letter H, is moved manually to a position where the load (not shown) to be moved is located. The platform A is lowered on frame B by placing the trigger G in a first position as shown in FIGURE 5. The hand truck H may then be used to transport the load (not shown) to a desired destination. Either before or after the destination is reached, the trigger G is placed in the second position shown in FIGURE 4 and the handle F of the jack mechanism E may then be employed to raise the platform A and the load thereon to the elevation at which it is to be disposed at its destination. Upon arrival at the destination thereof, the load may be easily slid from the platform A at the elevated position it is to occupy. Thereafter, the hand truck H is available for use in moving other loads.

The frame B of the hand truck H, as can best be seen in FIGURE 1, includes two inverted U-shaped side pieces 10. Each side piece 10 comprises a forwardly disposed leg 12 and a rearwardly disposed leg 14 that is parallel thereto. The upper ends of legs 12 and 14 develop into a curved web 16 that serves as a hand grip for moving the hand truck H from place to place. The lower ends of side pieces 10 develop into downwardly and forwardly sloping extensions 17 that abut against the lower rear end portions of legs 12 and are rigidly affixed thereto by welding, or the like.

A shaft 18 extends transversely between legs 14 and is rigidly affixed thereto by welding, or the like. The ends of shaft 18 project outwardly beyond the legs 12 and 14 and supports two wheels D thereon. A rectangular plate 20 is welded, or otherwise affixed to the lower ends of the forward legs 12, and this plate serves as a stop to limit the downward movement of platform A.

A reinforcing cross piece 22 extends between the upper portions of the forward legs 12 and is rigidly affixed thereto. The upper end portion of the rack bar C is affixed to the cross piece 22, and the lower end of the rack bar is rigidly affixed to a rear upper portion of plate 20 (FIGURE 1). Two tubular sleeves 24 of substantial length are slidably mounted on the legs 12.

The platform A is defined by a flat plate 26 that has a flange 28 projecting upwardly from the rear portion thereof, which flange is disposed at substantially a right angle relative to the plate. The rear end portions of flange 28 are rigidly affixed to the lower forward portions of the sleeves 24 by welding, or the like. The flange 28, as best seen in FIGURE 4, is rigidly affixed to the forward portion of the jack mechanism E.

The rack bar C, as shown in both FIGURES 1 and 4, has a number of teeth 30 formed on the rear face thereof, which are sequentially engaged by the jack mechanism E as the handle F is reciprocated to move the jack mechanism and the platform A upwardly as a unit on the frame B to a desired elevation thereon. When it is desired to lower the jack mechanism E and platform A as a unit, the trigger G is utilized to free the jack mechanism from the teeth 30 and permit the jack mechanism and platform to move downwardly on the frame B to a desired elevation thereon.

In detail, the jack mechanism E (FIGURES 4 and 5) includes two laterally spaced, parallel plates 32 that extend rearwardly from the flange 28. The plates 32 are located on opposite sides of the rack bar C. One of the plates 32 is shown in detail in FIGURES 4 and 5. The handle F is pivotally supported on a pin 34 that extends transversely between plates 32. Pin 34 also pivotally supports a pawl 36 which is connected by a tensioned helical spring 38 to a ratchet 40. The ratchet 40 is pivotally supported by a pin 42 from the handle E.

When the jack mechanism E is not in use, the tensioned spring 38 draws the pawl 36 to the position shown in FIGURE 5 where it is out of contact with the teeth 30 of the rack bar C. A trigger mechanism 46 of conventional design is provided that is movably supported in an L-shaped slot 48 formed in one of the plates 32, with the mechanism being capable of occupying a first position as shown in FIGURE 5, or a second position illustrated in FIGURE 4.

When the trigger mechanism 46 is in the second position it bows the spring 38 forwardly to place the pawl 36 in pressure contact with the teeth 44, and when the handle F is pivoted in a clockwise direction, the entire jack mechanism E, together with the platform A, is moved upwardly relative to the frame B. The pawl 36 sequentially engages the teeth 30 as the ratchet 40 engages the teeth to move the jack mechanism E upwardly. Due to engagement thereof with teeth 30, the pawl 36 prevents the jack mechanism E and platform A from moving downwardly on frame B as handle F is reciprocated. To lower the jack mechanism E and platform A relative to frame B, the trigger mechanism 46 is manually placed in the first position shown in FIGURE 5 to permit the ratchet 40 to be disengaged from the teeth 30.

The use and operation of the invention have been previously described in detail and need not be repeated.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. A hand truck, including:
   (a) two inverted U-shaped transversely spaced side pieces, each of which comprise forward and rear legs that develop on their upper ends into a curved web which serves as a handle when said truck is being moved;
   (b) two extensions of said rear legs which slope downwardly and forwardly from the lower ends thereof and are rigidly connected at the forward ends to the lower rear end portions of said forward legs;
   (c) a plate affixed to the lower ends of said forward legs and projecting forwardly therefrom;
   (d) a cross piece extending transversely between the upper portions of said forward legs;
   (e) a toothed rack bar intermediately disposed between said forward legs, with the upper and lower ends of said forward legs being rigidly connected to said cross piece and plate;
   (f) a transversely disposed shaft affixed to the lower portions of said rear legs;
   (g) two wheels rotatably supported on end portions of said shaft;
   (h) two elongated tubular sleeves slidably mounted on said forward legs;
   (i) a platform affixed to the lower forward portions of said sleeves and extending forwardly therefrom; and
   (j) a manually operable jack mechanism that engages said rack bar, said jack mechanism being rigidly connected to said platform and when manipulated being capable of moving upwardly on said rack bar, moving said platform therewith, with said rack bar together with said side pieces, cross pieces, extensions and said plate cooperatively defining a frame of sufficient strength to withstand the maximum weight that will be placed on said platform, and with said rack bar also cooperating with said jack mechanism to permit said platform to be raised to a desired elevation above said shaft.

2. A hand truck as defined in claim 1 wherein said wheels and plate are so dimensionally related that when at least a portion of said plate is in contact with the surface on which said wheels rest, said end pieces are supported in substantially vertical positions.

3. A hand truck as defined in claim 1 wherein said jack mechanism includes:
   (k) a rearwardly extending handle which when reciprocated moves jack mechanism and platform as a unit upwardly on said rack bar; and
   (l) means on said jack mechanism which when moved from a first to a second position reverse the movement of said jack mechanism and platform when said handle is reciprocated.

4. A hand truck as defined in claim 1 wherein said sleeves are of sufficient length that said sleeves do not bind on said forward legs when said platform carries the maximum load to which it will be subjected.

References Cited by the Examiner
UNITED STATES PATENTS

| | | | |
|---|---|---|---|
| 513,201 | 1/1894 | Robinson et al. | 187—9 |
| 2,743,833 | 5/1956 | Peterson | 214—512 X |
| 2,823,958 | 2/1958 | Terry | 254—6.6 |
| 2,838,190 | 6/1958 | Stevens | 214—374 |
| 2,895,567 | 7/1959 | Hall | 187—9 |

GERALD M. FORLENZA, *Primary Examiner.*